June 17, 1969    E. R. ZIEGLER    3,449,785
WIPER CONTROL

Filed April 29, 1966    Sheet 1 of 2

INVENTOR.
Eugene R. Ziegler
BY
Donald P. Selwerski
His Attorney

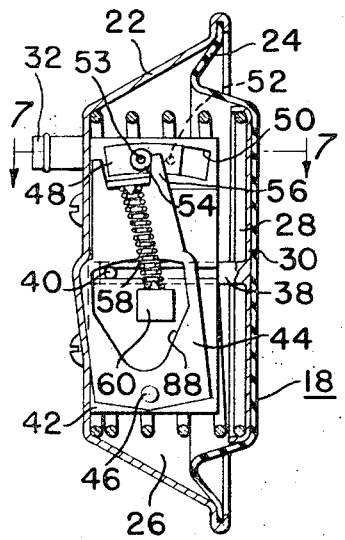
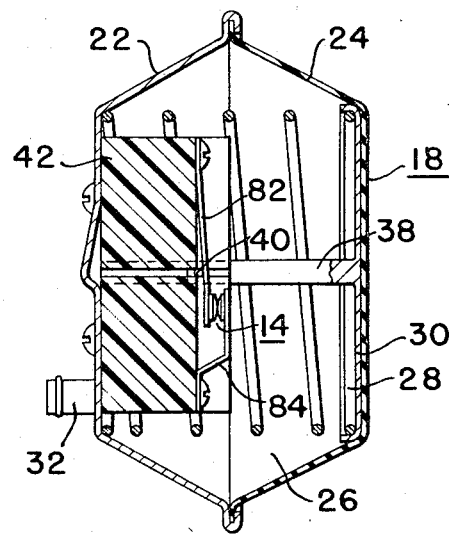
Fig. 3          Fig. 4
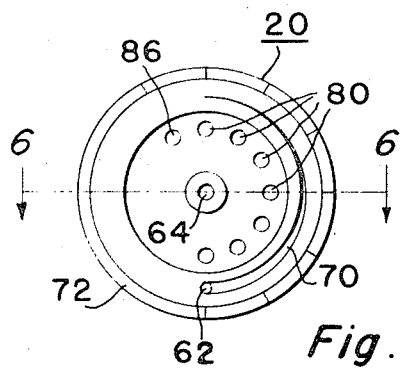
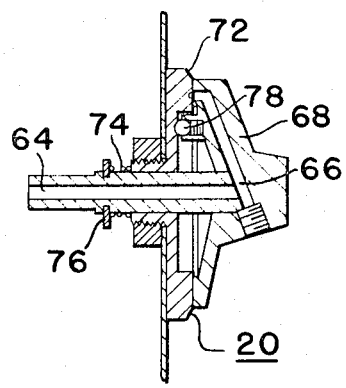
Fig. 5          Fig. 6
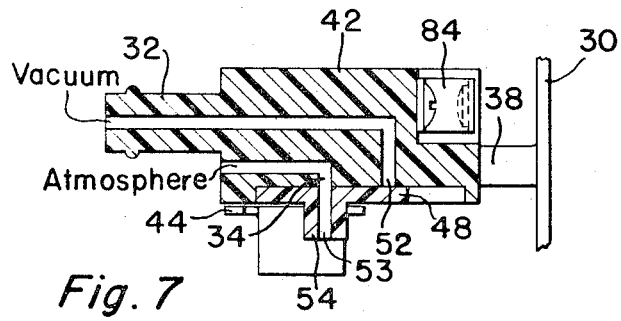
Fig. 7
INVENTOR.
Eugene R. Ziegler
BY
His Attorney

United States Patent Office 3,449,785
Patented June 17, 1969

3,449,785
WIPER CONTROL
Eugene R. Ziegler, Spencerport, N.Y., assignor to General Motors Corporation, Detroit, Mich., a corporation of Delaware
Filed Apr. 29, 1966, Ser. No. 546,276
Int. Cl. B60s 1/10; A47l 1/02
U.S. Cl. 15—250.12          7 Claims

ABSTRACT OF THE DISCLOSURE

In a preferred form, this disclosure relates to a windshield wiper control mechanism for controlling operation of an electric motor of an electrically driven windshield wiper. The control mechanism includes a first control means for intermittently effecting operation of the electrically driven windshield wiper through one cycle and with intervening dwell or rest periods. The first control means includes a switch means for controlling energization and de-energization of the motor, a vacuum responsive means in communication with a vacuum source and which includes an actuating member movable in opposite directions, a valve means operatively connected with the actuating member and movable between first and second positions in which it communicates the vacuum source with the vacuum responsive means and blocks communication between the vacuum responsive means and the atmosphere and vice versa, respectively, and a means for biasing the actuating member towards a first position in which it actuates the switch means and biasingly holds the valve means in its first position. The actuating member of the vacuum responsive means being movable in a first direction from its first position in opposition to the biasing force of the biasing means when the vacuum source is in communication therewith and during which it is operable to first de-actuate the switch means to de-energize the motor and thereafter effect movement of the valve means to its second position to vent the vacuum responsive means to the atmosphere. The biasing means is effective to move the actuating member in the opposite direction when the vacuum responsive means is vented to the atmosphere, this movement being effective to actuate the switch means and to energize the motor and move the valve means towards its first position in which it again communicates with the vacuum source. The control mechanism additionally includes a second control means for varying the magnitude of vacuum pressure communicated to the vacuum responsive means to vary the length of time required to move the actuating member through its movement in its first direction and thereby control the dwell period between cycles of operation of the wiper.

This invention relates to windshield wiper control mechanisms and more particularly to a vacuum cycled pulse controller for electrically powered windshield wipers.

Electrically operated windshield wipers of the type generally known as pulse wipers very often are electrically controlled with a certain degree of extra expense allotted for the controller portions. In addition, the degree of accuracy necessary for electrically controlling pulse wipers necessitates the use of more than simple electrical gear. It is desirable to provide a controller for an electrically powered windshield wiper that is not electrical in nature and involves very simple control mechanism.

It is an object of the present invention to provide an improved pulse control for an electrically operated windshield wiper which has a variable frequency for the pulse and is capable of being selectively thrown into continuous operation.

It is another object of the present invention to provide an improved pulse control for an electrically operated windshield wiper which utilizes engine intake manifold vacuum to both initiate the individual cycle of wiping and controls for changing the frequency of the wiping action.

It is still another object of the present invention to provide an improved pulse control for an electrically operated windshield wiper which utilizes a very simple vacuum responsive unit to initiate a wiping cycle and which automatically measures a predetermined frequency of cycling.

Further objects and advantages of the present invention will be apparent from the following description, reference being had to the accompanying drawings wherein a preferred embodiment of the present invention is clearly shown.

Figure 1:
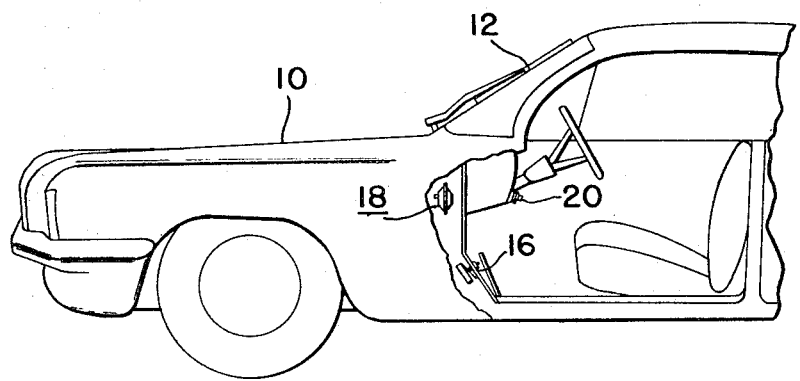
Figure 2:
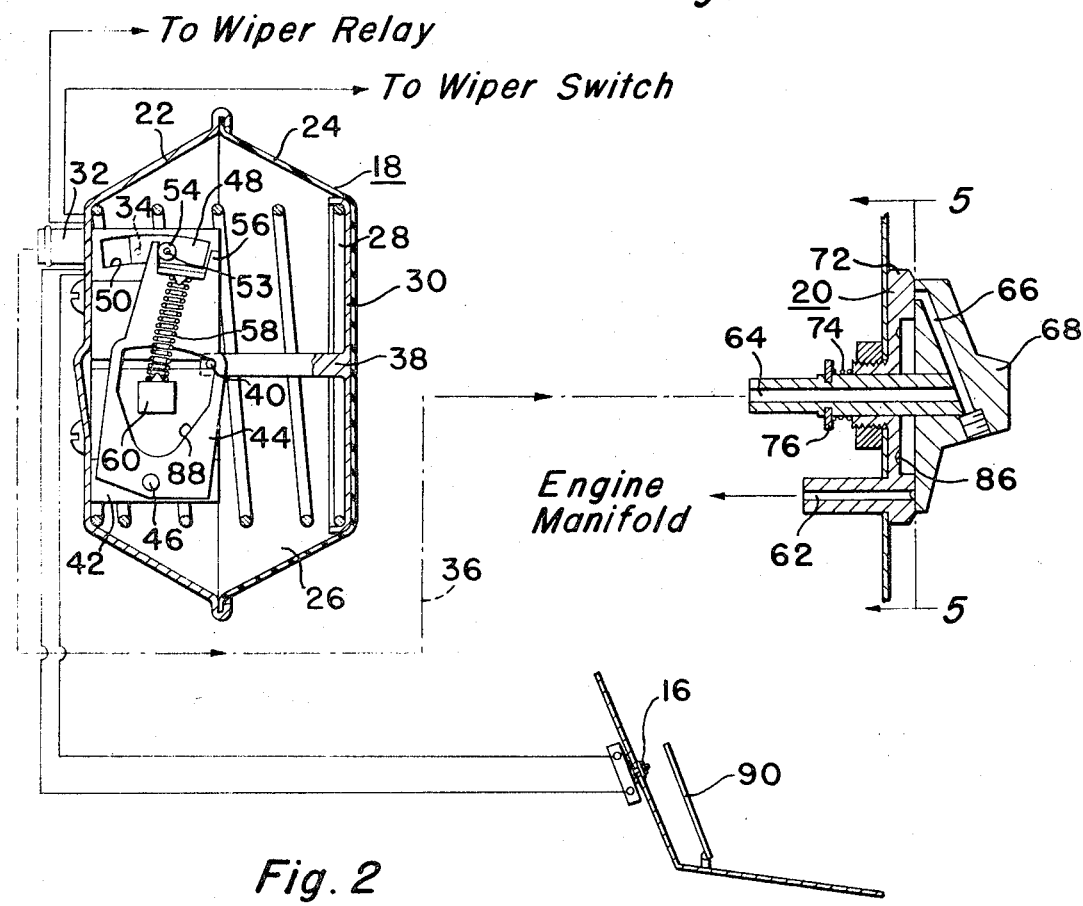

In the drawings:
FIGURE 1 is an elevational view of a vehicle showing the invention in its operative environment;
FIGURE 2 is a diagrammatic illustration of the subject invention with the control mechanism shown in the OFF position;
FIGURE 3 is a sectional view of the vacuum responsive portion of the subject invention shown in a configuration it assumes at the initiation of a wiping cycle;
FIGURE 4 is a sectional view of a different portion of the vacuum responsive portion of the subject invention shown in FIGURE 2 which illustrates electrical contacts in an engaged disposition;
FIGURE 5 is an elevation view taken along line 5—5 of FIGURE 2;
FIGURE 6 is a sectional view taken along line 6—6 of FIGURE 4;
FIGURE 7 is a sectional view taken along line 7—7 of FIGURE 3.

Referring to FIGURE 1, a vehicle 10 is shown equipped with electrically operated wipers 12 controlled by control means 20 and a foot pedal operated switch 16.

Referring to FIGURE 2, a vacuum responsive means generally designated by numeral 18, is supplied vacuum by control means 20 ultimately from the engine manifold, not shown, of vehicle 10. Foot pedal operated switch 16 is in parallel with electrical leads to wiper switch 14 and a wiper relay enabling the pulsing function of the subject device to be overridden on demand.

Referring to FIGURE 2, vacuum responsive means 18 is generally formed of a substantially rigid cup-shaped member 22 interlocked with a flexible portion 24 together forming an enclosed area 26 which is to be evacuated. Spring 28 acts against spring retainer 30 engaging flexible portion 24 and the inside portion of cup-shaped member 22 to maintain vacuum responsive means 18 in expanded disposition during operating periods when little or no vacuum is communicated to area 26. Vacuum inlet 32 and outlet 34 therefore communicate vacuum pressure from control means 20 through line 36 diagrammatically shown.

Drive rod 38 is carried by spring retainer 30 and includes drive pin 40. Switch carrier 42 is carried by cup-shaped member 22 in any well-known manner and in turn pivotally supports shiftable means 44 at point 46. Valve member 48 is movable in an arcuate slot 50 and selectively covers atmospheric outlet 34 and vacuum outlet 52, both selectively communicating with area 26 through aperture 53 in drive pin 54. This arrangement is best seen in FIGURE 7. Drive pin 54 is carried on valve member 48 and is alternately engaged by either side of yoke end 56 of shiftable means 44. Toggle spring 58 is a member compressed between valve member 48 and mounting block 60 carried by switch carrier 42.

Control means 20, as viewed in FIGURE 2, has an inlet 62 from the engine intake manifold and an outlet 64 to line 36. Outlet 64 communicates with passage 66 internally formed in knob 68 to selectively communicate a varying degree of vacuum from inlet 62 and tapered groove 70, better seen in FIGURE 5.

Referring to FIGURE 6, knob 68 is integrally formed with outlet 64 and is rotatable in member 72 forming the body of control means 20. Knob 68 is biased against member 72 by the force of spring 74 acting between retainer 76 and member 72. A locating ball 78 is spring loaded in its mounted position in knob 68 and cooperates with detenting grooves 80 formed in member 72 to positively locate knob 68 during rotation thereof in several predetermined positions.

Referring to FIGURE 4, switch blade member 84 is relatively fixed and is selectively disengaged from deflectable switch blade member 82 when drive pin 40 of drive rod 38 moves during vacuum buildup in chamber 26. As previously stated, switch blades 82 and 84 and switch 14 are carried by switch carrier 42 and serve to initiate a cycle of the electrically driven wipers 12.

In operation, when it is desired to initiate a pulse wiping action of wipers 12, knob 68 is turned so that ball 78 is moved from parking detent 86, as seen in FIGURE 5, to any other one of the detenting grooves 80. In any one of the detenting grooves 80, passage 66 is placed in fluid communication with a portion of tapered groove 70 admitting vacuum pressure to area 26, as viewed in FIGURE 2. Vacuum admitted to area 26 will compress vacuum responsive means 18 against the bias of spring 28 causing drive rod 38 to move to the left, as viewed in FIGURE 2. Drive pin 40 carried by drive rod 38 will move eventually against an inside wall of aperture 88 formed in means 44. Shiftable means 44 will pivot around point 46 until it assumes the position shown in FIGURE 3. During this movement one of the yoke ends 56 will pick up drive pin 54 and causing valve member 48 to slide in slot 50 closing off outlet 52. Outlet 34 to the atmosphere will be exposed resulting in atmospheric pressure and spring 28 expanding flexible portion 24 toward the configuration shown in FIGURE 2.

Movement of drive rod 38 and drive pin 40 toward the configuration of FIGURE 2 results in a deflection of switch blade member 82 into switch blade member 84. An electrical circuit is thereby completed to the wiper relay causing wiper 12 to initiate a wiping action through one cycle. A detent arrangement on a motor, not shown, allows the wiper motor to operate through one cycle and stop automatically when one wipe has been completed. This method of cycling the wiper motor is more clearly shown in Patent No. 3,059,274 wherein a cam operated switch responding to motor movement is illustrated.

Immediately upon the movement of flexible portion 24 toward the expanded disposition shown in FIGURE 2, contact is made between members 84 and 82 because switch blade member 82, which is spring loaded away from member 84, is moved into engagement with contact member 84 by the pin 40. An opposite yoke end 56 of shiftable means 44 picks up drive pin 54 and causes a reverse sliding movement of a valve member 48 in slot 50. Outlet 34 is covered and outlet 52 to vacuum is exposed through aperture 53. Flexible portion 24 very quickly assumes the expanded disposition shown in FIGURE 2 as engine vacuum is again applied to area 26 through control means 20. As the flexible portion begins to collapse and drive pin 40 and drive member 38 are moved toward the left, switch contact member 82, since it is spring loaded away from the contact member 84, disengages the contact member 84 to de-energize the circuit through switch 14 to the motor. The motor however, remains energized for one cycle due to the cam operated switch arrangement, as described above. The length of time it takes to recollapse flexible portion 24 represents the interval between pulses of wiper 12 and is controlled by the amount of vacuum admitted to area 26 through control means 20. The radial disposition of passage 66 relative to tapered groove 70 determines the amount of vacuum admitted to area 26 and ultimately controls the pulsing interval. Therefore, it is seen that merely turning knob 68 to admit vacuum to area 26 results in an automatic start for the cycling of wipers 12 as well as controlling the interval between wiping cycles.

The subject invention has the added feature of a foot pedal operated switch 16 which is of any well-known construction and constitutes a switch in parallel with switch blade members 84 and 82 to allow the overriding thereof. When accelerator pedal 90 is depressed sufficiently, switch 16 is made resulting in the energization of the wiper relay. As long as switch 16 is depressed, wipers 12 will continually operate. The purpose of this feature is to allow continuous operation of wipers 12 during periods when the accelerator pedal is depressed a predetermined distance due to passing or due to sustained high speeds. Under these driving conditions, it is desirable to have a continuously operating wiper.

It is seen that the subject invention provides a vacuum powered control for an electrically operated wiper and very simply and economically initiates a wiping cycle and, depending on the setting of a simple control means, effects a variation of a predetermined magnitude of vacuum applied to a vacuum responsive means, thereby allowing a selection of a pulsing interval. In addition, the subject mechanism is adapted for conversion to a continuous wiping system by merely depressing an accelerator pedal a predetermined amount.

While the embodiment of the present invention, as herein disclosed, constitutes a preferred form, it is to be understood that other forms might be adopted.

What is claimed is as follows:

1. A windshield wiper control mechanism for controlling operation of a motor of an electrically driven windshield wiper for a vehicle comprising: a fluid pressure source; means including actuating means responsive to fluid pressure from said source for intermittently effecting operation of said electrically driven windshield wiper through one cycle and with intervening rest intervals; means for communicating said pressure responsive means with said pressure source; and control means for varying the magnitude of the pressure acting on said actuating means to vary the length of time of said rest intervals.

2. A windshield wiper control mechanism as defined in claim 1 wherein said pressure source is a negative pressure source and wherein said control means includes a fixed portion in connection with said negative pressure source and a rotatable portion movable relative to said fixed portion, said rotatable portion when rotated relative to said fixed portion varying the extent of the communication between said negative pressure source and said actuating means and thereby varying the magnitude of the pressure acting on said actuating means.

3. A windshield wiper control mechanism as defined in claim 1 and including switch means actuatable in response to depression of an accelerator pedal of the vehicle for effecting continuous operation of said motor of said electrically driven windshield wiper.

4. A windshield wiper control mechanism for controlling operation of an electric motor of an electrically driven windshield wiper comprising: a vacuum source; first control means for intermittently energizing the motor to effect operation of said electrically driven windshield wiper through one cycle and with intervening dwell periods, said first control means including a switch means for controlling energization and de-energization of said motor, vacuum responsive means including an actuating member movable in opposite directions, means for communicating said vacuum responsive means with said vacuum source, a valve means operatively connected with said actuating member and movable between first and second positions in which it communicates said vacuum source with said vacuum responsive means and blocks communication between said vacuum responsive means and the atmosphere and vice versa, respectively, means for biasing said actuating member toward a first position in which it is operable to actuate said switch means, said actuating member being movable in a first direction from its first position in opposition to the biasing force of said biasing means when said vacuum source is in communication with said vacuum responsive means, said actuating member when moved in said first direction being operable to first deactuate said switch means to de-energize said motor and thereafter effect movement of said valve means from its first position towards its second position; said biasing means being effective to move said actuating member in the opposite direction towards its first position when said valve means is in its second position, said actuating member when moved in said opposite direction effecting actuation of said switch means to energize said motor to initiate a cycle of operation of said wiper and movement of the valve means towards its first position; and second control means for varying the magnitude of the vacuum pressure communicated to said vacuum responsive means to vary the length of time required to move said actuating member through its movement in said first direction and thereby vary the dwell period between cycles of operation of said wiper.

5. A windshield wiper control mechanism as defined in claim 4 wherein said valve means includes a valve member supported for movement in opposite directions, an actuator element supported for pivotal movement in opposite directions between first and second positions and which is engageable with said valve member, a toggle spring means connected with said actuator element for biasing said actuator in either of its first and second positions, said actuating member of said vacuum responsive means being operable to engage said actuator element to pivot the same between its positions and cause said toggle spring means to be moved over center during movement thereof to bias the actuator element and hence, the valve member to the position in which it is moved.

6. A windshield wiper control mechanism as defined in claim 5 wherein said actuator element has a lost motion connection with the valve member and wherein said actuating member has a lost motion connection with said actuator element.

7. A windshield wiper control mechanism as defined in claim 5 wherein said actuator element has a yoke end engageable with said valve member to effect shifting movement thereof in response to the pivoting of said actuating element when engaged by said actuating member of said vacuum responsive means.

References Cited
UNITED STATES PATENTS

| | | | |
|---|---|---|---|
| 3,117,335 | 1/1964 | Oishei et al. | 15—250.12 |
| 3,110,056 | 11/1963 | Oishei et al. | 15—250.12 |
| 3,168,758 | 2/1965 | Oishei et al. | 15—250.12 |

WALTER A. SCHEEL, *Primary Examiner.*

R. I. SMITH, *Assistant Examiner.*